Sept. 6, 1960  C. V. CROCKETT ET AL  2,951,548
TILT CAB FOR TRUCKS

Filed June 24, 1957  3 Sheets-Sheet 1

INVENTORS
Clarence Vail Crockett,
Samuel Lord Wallwork,
BY Lewin Koehler Weiss

W. S. Pettigrew
ATTORNEY

Sept. 6, 1960 — C. V. CROCKETT ET AL — 2,951,548
TILT CAB FOR TRUCKS
Filed June 24, 1957 — 3 Sheets-Sheet 2
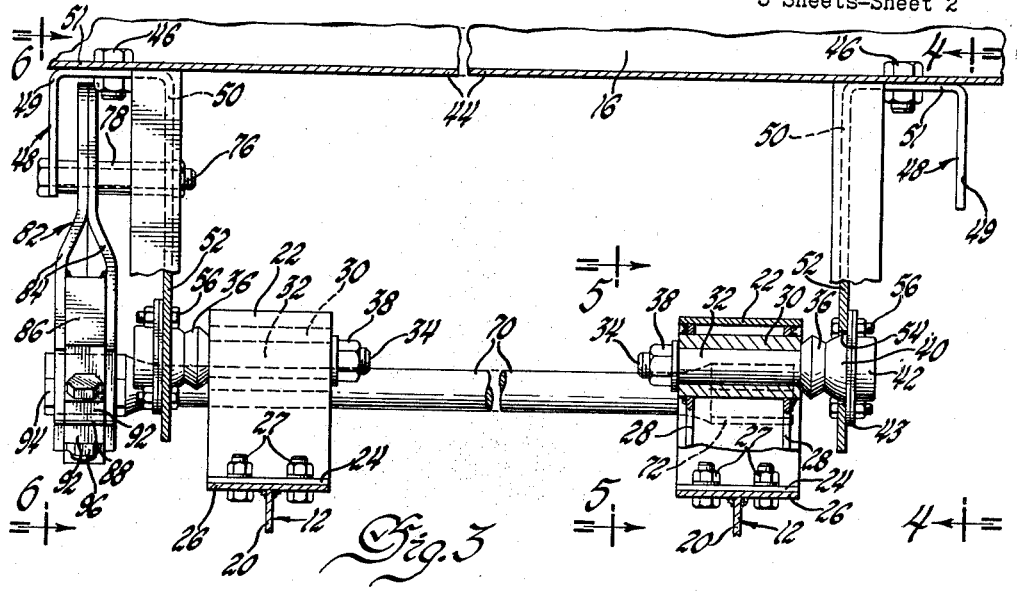
INVENTORS
Clarence Vail Crockett,
Samuel Lord Wallwork,
BY Lewin Koehler Weiss
W. S. Pettigrew
ATTORNEY Sept. 6, 1960 C. V. CROCKETT ET AL 2,951,548
TILT CAB FOR TRUCKS
Filed June 24, 1957 3 Sheets-Sheet 3
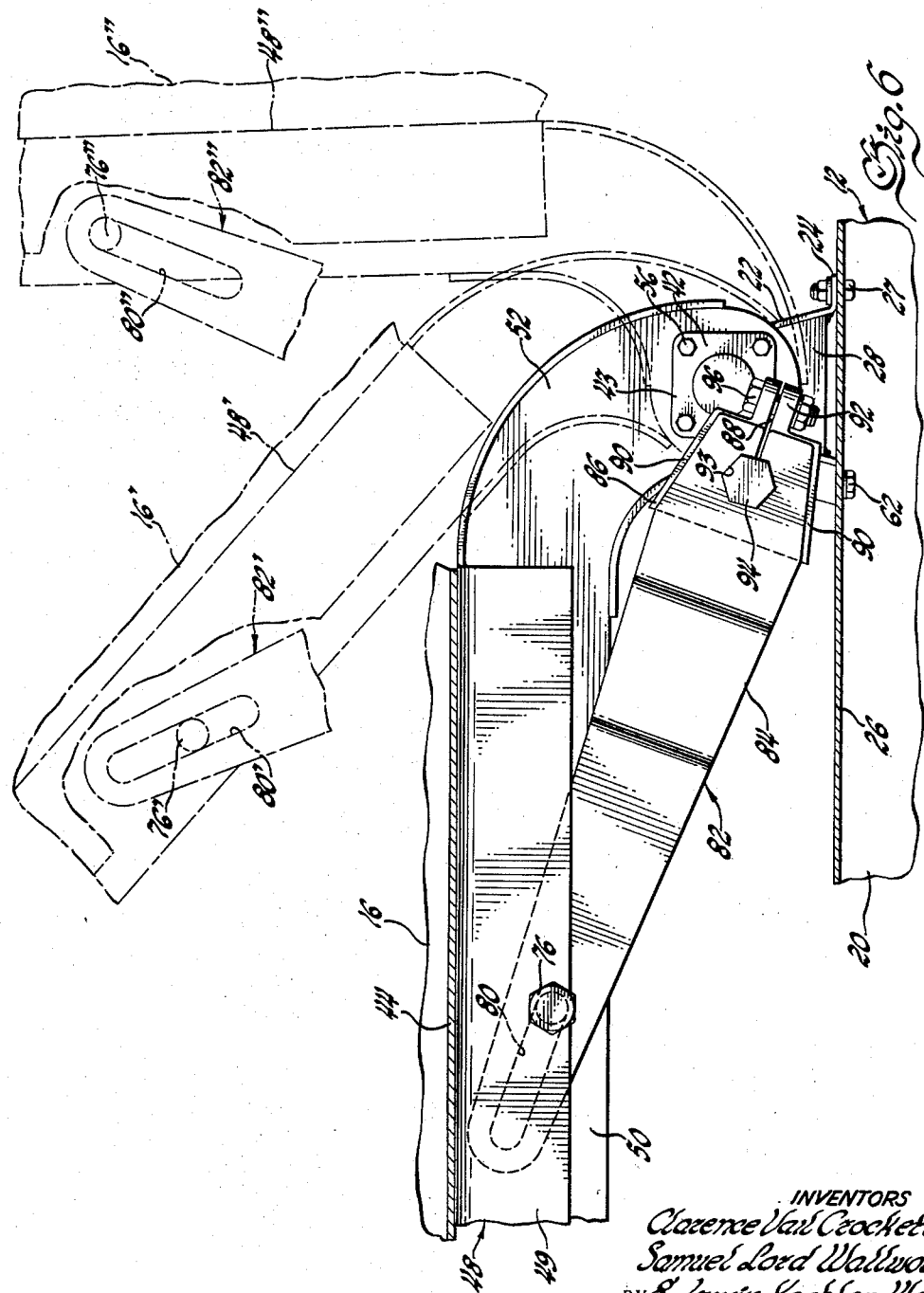
INVENTORS
Clarence Vail Crockett,
Samuel Lord Wallwork,
BY Lewin Koehler Weiss
W. S. Pettigrew
ATTORNEY

United States Patent Office 2,951,548
Patented Sept. 6, 1960

2,951,548

TILT CAB FOR TRUCKS

Clarence V. Crockett, Bloomfield Hills, Samuel L. Wallwork, Pontiac, and Irwin K. Weiss, Birmingham, Mich., assignors to General Motors Corporation, Detroit, Mich., a corporation of Delaware Filed June 24, 1957, Ser. No. 667,571

9 Claims. (Cl. 180—89)

This invention relates generally to tilting truck cabs, and more particularly to a counterbalance means for tilting truck cabs.

The counterbalance means of this invention is particularly intended for use with forwardly tilting cabs of cab-over-engine trucks. In such trucks, the power plant is usually mounted on the chassis frame adjacent the front steerable wheels of the truck and beneath the truck cab. In order to provide access to the power plant for repairs, replacement or otherwise, the cab is usually pivoted adjacent its lower forward edge to the forward edge of the chassis and is swingable forwardly of the chassis from the normal position to the forwardly tilted out-of-the-way position. Since most of the weight of the cab is rearwardly of the pivotal axis thereof when the cab is in the normal position and is forwardly of the pivotal axis thereof when the cab is in the tilted position, it is advantageous to provide a counterbalance means which will assist both in movement of the cab from the normal to the forwardly tilted position thereof and in movement of the cab from a forwardly tilted position thereof to a normal position thereof.

The counterbalance means of this invention assists both in movement of the cab from the normal position to the forwardly tilted position thereof and in movement of the cab from the forwardly tilted position to the normal position thereof. In the preferred embodiment of the invention, the neutral position of the counterbalance means, wherein the counterbalance means exerts no counterbalancing force, corresponds to a position of the truck cab which is intermediate the normal position thereof and the forwardly tilted position thereof and wherein the weight of the cab is substantially equally distributed to either side of the pivotal axis thereof. Thus, as the cab is moved from the normal position to the intermediate position thereof, the counterbalance means initially exerts a high counterbalancing force which gradually decreases as the cab is moved to the intermediate position. As the cab is moved from the intermediate position to the forwardly tilted position, the counterbalance means initially exerts a slight counterbalancing force which gradually increases as the cab is moved from the intermediate position to the forwardly tilted position thereof. Thus, the weight of the cab cooperates with the operator and against the counterbalance means in movement of the cab from the intermediate position thereof to either the forwardly tilted or normal positions thereof, and the counterbalance means cooperates with the operator and against the weight of the cab in movement of the cab from either the normal or the forwardly tilted position thereof to the intermediate position thereof. By providing a counterbalance means of this type, the cab may be easily moved between normal and forwardly tilted positions without having the operator exert any undue effort.

The primary object of this invention is to provide a new and improved counterbalance means for tilting truck cabs. Another object of this invention is to provide a new and improved counterbalance means for tilting truck cabs which will assist in movement of the cab between normal and forwardly tilted positions. A further object of this invention is to provide a new and improved counterbalance means for tilting truck cabs which will counterbalance the weight of the truck cab in both the normal and the forwardly tilted position thereof.

These and other objects of this invention will be readily apparent from the following specification and drawings wherein:

Figure 3 is an enlarged view of a portion of Figure 2 with parts thereof broken away for clarity of illustration;

Figure 4 is a sectional view taken on the plane indicated by the line 4—4 of Figure 3;

Figure 5 is a sectional view taken on the plane indicated by line 5—5 of Figure 3; and Figure 6 is an enlarged view taken on the plane indicated by line 6—6 of Figure 3.

Figure 1:
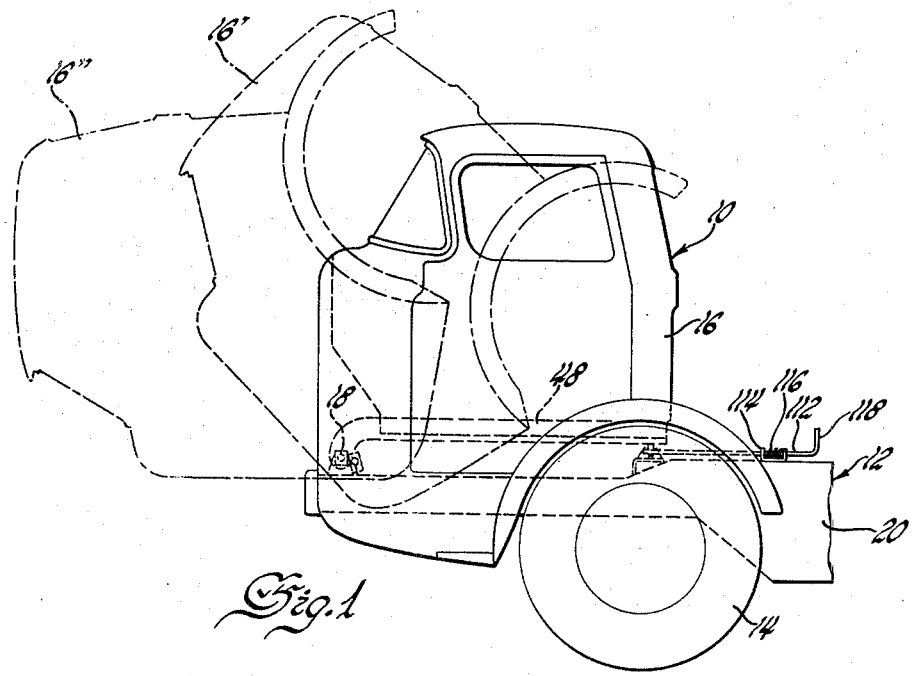
Figure 1 is a side elevational view of a truck having a forwardly tilting truck cab and embodying a counterbalance means according to this invention, with the truck cab being shown in normal position in full lines and being shown in intermediate and forwardly tilted positions in dotted lines.
Figure 2:
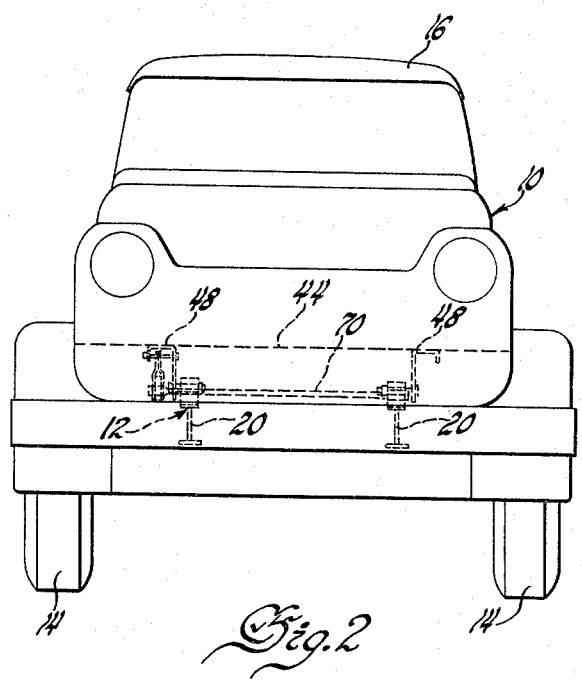
Figure 2 is a front elevational view of the truck of Figure 1.

Referring now particularly to Figure 1 of the drawings, a truck 10 includes a chassis frame 12, a pair of steerable front wheels 14 which support the forward end of the chassis frame, and a cab 16 supported on the chassis frame for forward tilting movement in a manner to be described. Although not shown in the drawings, it will be understood that the vehicle power plant is supported on the chassis frame 12 and is located beneath the cab 16 immediately adjacent the front wheels 14. Since access is often needed to the power plant for repairs, replacement or otherwise, it is desirable that the cab 16 be movable to an out-of-the-way position so as to provide the necessary space to obtain access to the engine. This space is provided by supporting the cab 16 on the chassis frame for forward tilting movement about a horizontal axis 18 positioned adjacent the lower forward edge of the cab and the forward end of the chassis frame 12. Thus, the cab may be moved from the normal position thereof shown in full lines, through an intermediate position 16' to a forwardly tilted position 16" wherein the cab is positioned in an out-of-the-way position allowing access to the power plant. During movement of the cab between the normal position thereof and the forwardly tilted position thereof, it swings through an arc of approximately 90°, with the intermediate position 16' corresponding to an arc of movement of 45° with respect to either the normal position or the forwardly tilted position of the cab.

Referring now particularly to Figures 2 through 6 of the drawings, the manner in which the cab 16 is supported on the chassis frame 12 for forward tilting movement about the axis 18 will be described. As shown best in Figures 2 and 3 of the drawings, the chassis frame 12 includes a pair of spaced longitudinally extending chassis side rails 20 which are interconnected in a suitable manner to provide a rigid substantially unitary load bearing structure. Although the side rails are shown as being of I beam construction, it will be understood that they may be of other constructions, such as box construction. Since the manner in which the cab is hinged to each of the rails 20 is the same, only the right hand hinge construction will be particularly described and it will be understood that the left hand construction is the same although of different hand. A generally U-shaped bracket 22 includes a forward flange 24 which bears against the upper flange 26 of rail 20 and is bolted thereto at 27.

As shown best in Figure 3, a pair of spaced apertured plates 28 fit within bracket 22 and are secured thereto to provide a mounting means for a bushing or sleeve 30 which extends between the plates and is rigidly secured thereto.

A hinge pin 32 extending through the sleeve 30 includes a threaded end 34 located inboard of the sleeve and an intermediate annular beveled shoulder 36 located outboard of the sleeve. A nut 38 threaded on the end 34 of the hinge pin holds the annular beveled shoulder 36 thereof in engagement with the outboard end of the sleeve 30 so that the hinge pin 32 is stationary with respect to the sleeve. Although not shown in the drawings, the hinge pin 32 is provided with a generally hemispherical portion immediately adjacent the annular shoulder 36 and a generally cylindrical end immediately adjacent the hemispherical portion. The hemispherical portion is rotatably received within a similarly shaped portion of a bracket 40, with the adjacent generally cylindrical end of the hinge pin being rotatably received within a similarly shaped portion of a bracket 42. The brackets 40 and 42 are provided with lateral flanges 43 which seal against each other.

Since the details of the truck cab 16 form no part of this invention, none are shown. However, it will be understood that the cab includes a lower floor pan 44 which provides a wall between the interior of the truck cab and the power plant mounted on the chassis frame 12 as previously described. As shown best in Figure 3, the floor pan of the cab is bolted at 46 to the spaced right and left-hand cab rails 48. Each of the rails is of the same construction and therefore only the right-hand rail will be particularly described. The rail is generally of U-shaped construction including an outer wall 49 and an inner wall 50 joined by a base wall 51 which bears against the floor pan 44 and is bolted thereto at 46 as previously described. The inner wall 50 of the rail extends forwardly and downwardly into an arcuate extension 52 which is provided with an aperture 54 adjacent its end. The aperture 54 receives the hemispherical shaped portion of the bracket 40, with the flanges 43 of both brackets 40 and 42 being bolted together and to the extension 52 at 56 immediately adjacent the opening 54 as shown particularly in Figure 3. The hinge pins 32 are aligned transversely of the cab and the axes of the pins define the horizontal axis 18 of swinging movement of the truck cab relative to the chassis frame. Thus, each side of the cab 16 is supported on each of the chassis frame side rails 20 for swinging movement about a horizontal axis 18 adjacent the lower forward edge of the cab and adjacent the forward end of the rails.

As will now be described, the cab 16 is provided with a counterbalance means to assist in movement of the cab between the normal position 16 thereof and the forwardly tilted position 16" thereof. As shown best in Figure 5, a block 60 is secured to the rear leg of each of the U-shaped brackets 22 and is bolted at 62 to the flange 24 of each of the side rails. A block 64 is bolted at 66 to each block 60. The right hand pair of blocks 60 and 64 are each cut out to provide a generally hexagonally-shaped opening 68, and the left hand pair of blocks 60 and 64 are each cut out to provide a generally cylindrically shaped opening, not shown. A torque rod 70 extends between the opposite pairs of blocks 60 and 64, with the right-hand end of the rod being provided with a hexagonally-shaped lug 72 which is received within the opening 68 defined by the right hand blocks 60 and 64 so as to anchor this end of the rod. The rod extends transversely of the cab from the right-hand pair of blocks 60 and 64 through the cylindrically shaped opening defined by the left-hand pair of blocks 60 and 64, and then outboard beyond the inner wall 50 of the left-hand cab rail 48 as shown best in Figure 3 of the drawings.

A bolt 76 extends between the outer and inner walls 49 and 50 of the left-hand cab rail 48 and is provided with a sleeve 78 which surrounds the bolt and fits between the walls of the rail. The sleeve 78 is slidably received within an elongated opening 80 provided in the upper end of an arm 82. The arm 82 includes a pair of similarly shaped members 84 having their upper ends secured together and their lower ends diverging outwardly from each other as best shown in Figure 3. A block 86 fits between the diverging lower ends of the members 84 and is welded or otherwise secured thereto. As best shown in Figure 6 of the drawings, the block 86 is slotted at 88 in order to define opposite bifurcated legs 90, each of which is provided with a lug 92. The slot 88 opens to a hexagonally-shaped opening through the block 86 which is aligned with hexagonally-shaped openings 93 in each of the members 84 of arm 82. The left-hand end of the torque rod 70 is provided with a hexagonally-shaped lug 94 which is received within the similarly shaped opening in block 86 and also the similarly shaped openings 93 in each of the members 84 of the arm 82. After the lug 94 has been positioned within the openings, a bolt 96 which extends between the lugs 92 is tightened so that the left-hand end of the torque rod is rigidly secured to the arm 82.

Referring now to Figures 1 and 6 of the drawings, the operation of the counterbalance means will be described. When the truck cab is in its position 16', the arm 82 is in its position 82' and the torque rod 70 is in its free position wherein it exerts no torque or twisting force biasing the arm to either of its positions 82 or 82". Thus, when the cab is moved from its position 16' to its position 16, the arm 82 is swung in a counterclockwise direction to wind the torque rod in the same direction so that the torque rod exerts a torque force tending to swing the arm 82 in a clockwise direction and counterbalance the cab toward the position 16'. Similarly, if the truck cab 16 is moved from its position 16' to its position 16", the arm 82 will be swung in a clockwise direction to wind the torque rod 70 in the same direction whereby the torque rod exerts a torque force tending to counterbalance the truck cab toward the position 16'. As previously mentioned, the truck cab moves through an arc of approximately 90° between its positions 16 and 16", with the intermediate position 16" of the cab corresponding to an arc of movement of approximately 45° from either of the other positions of the cab.

When the truck cab is in its position 16, it will be noted that substantially all of the weight of the cab is rearwardly of the pivotal axis 18 thereof. Thus, when the cab is moved from this position to the position 16', the counterbalancing force exerted by the arm 82 and the torque rod 70 is initially greatest when the cab is in the position 16 and substantially all of the weight of the cab is rearwardly of the pivotal axis 18. The counterbalancing force then gradually decreases to a neutral point when the cab is in the position 16' as the weight of the cab is gradually distributed both forwardly and rearwardly of the pivotal axis 18 thereof. When the cab is in the position 16', it will be noted that the weight of the cab is distributed approximately equally on either side of the pivotal axis 18 thereof so that the cab will remain in this position due to the approximately equal distribution of the weight thereof with respect to the axis 18 and the resistance, although slight, of the torque rod 70 to movement of the arm 82 to either of the positions 82 or 82". As the cab is moved from the position 16' to the position 16", the distribution of the weight of the cab gradually increases forwardly of the pivotal axis 18 of the cab as the torque rod 70 is gradually wound up so that the torque rod exerts a gradually increasing counterbalancing force which reaches its peak when the cab is in the position 16".

Thus, when the cab is moved from the position 16 to the position 16', the counterbalancing means, which generally includes the arm 82 and the torque rod 70, cooperates with the operator and against the weight of the cab in moving the cab between these positions. When the cab is moved from the position 16' to the position 16'', the weight of the cab cooperates with the operator and against the counterbalancing means in moving the cab between these positions.

When the cab is moved from the position 16'' to the position 16', the counterbalancing means assists the operator and works against the weight of the cab. Since the counterbalancing force exerted by the counterbalancing means is greatest when the cab is in the position 16'' and gradually decreases to a neutral point when the cab is in the position 16', the counterbalancing force gradually decreases as the weight of the cab is gradually distributed both forwardly and rearwardly of the pivotal axis 18 of the cab so that the counterbalancing means assists the operator and works against the weight of the cab in movement thereof between these positions. Similarly, when the cab is moved from the position 16' to the position 16, the counterbalancing force exerted by the counterbalancing means gradually increases as the weight of the cab is gradually distributed rearwardly of the pivotal axis 18 thereof so that the weight of the cab assists the operator and works against the counterbalancing means in movement of the cab between these positions.

Although the operation of the cab has been described with reference to movement of the cab from the intermediate position 16' to either of the positions 16 or 16'', it will be understood that movement between the positions 16 and 16'' may be continuous without having the cab stop at the position 16'. However, for certain types of repairs, it may not be necessary to move the cab to its forwardly tilting position 16'', since movement of the cab to the position 16' may give the necessary space for access to the engine.

It will also be noted upon reference to Figure 6, that the sleeve 78 is positioned in engagement with one end of the slot 80 in the normal position 16 of the cab, is positioned intermediate the ends of the slot 80 in the intermediate position 16' of the cab, and is positioned in engagement with the other end of the slot 80 in the forwardly tilted position 16'' of the cab. Thus, when the cab is in the position 16'', engagement of the sleeve 78 with the other end of the slot provides a limit stop preventing further tilting movement of the cab and accurately locating the cab in this position. Similarly, engagement of the sleeve 78 with the one end of the slot when the cab is in the position 16 provides a limit stop preventing movement of the cab beyond the normal position thereof and accurately locating the cab in this position.

Since the counterbalancing means exerts a counterbalancing force tending to bias the cab from the position 16 to the position 16', a latch means must be provided to hold the cab in the position 16 during normal use of the truck. This latch means will now be described, with particular reference to Figures 1 and 4 of the drawings. As shown particularly in Figure 4 of the drawings, a U-shaped bracket 100 is welded or otherwise secured to the upper flange 26 of the right-hand chassis side rail 20. A bifurcated lug 102 is welded to the base wall of bracket 100 and includes opposite legs defining a downwardly converging opening 104. A lug 106 of the shape of the opening 104 of lug 102 is bolted at 108 to the inner wall 50 of the right-hand cab side rail. Lugs 102 and 106 are apertured at 107 and 109, respectively, to receive the tapered end 110 of a slidable rod 112. The rod 112 is slidably mounted on the right-hand chassis side rail 20 by means of a U-shaped bracket 114 secured to the upper flange 26 thereof and provided with opposite apertured legs which slidably receive the rod. A coil compresison spring 116 surrounds the rod and seats against the opposite legs of the bracket 114. A pin or other suitable abutment on the rod 112 engages the spring 116 intermediate the ends thereof and normally holds the rod in latched position as shown. The rear end of the rod terminates in a handle 118 for manual operation. Thus, whenever it is desired to unlatch the cab from the right-hand chassis side frame rail, the handle 118 is grasped and the rod 112 is shifted rearwardly so as to release the lug 104 of the cab from in engagement with the lug 102 of the chassis frame side rails. Similarly, when the cab is moved from the positions 16' or 16'' to the position 16 or normal position thereof, the rod 112 is first shifted rearwardly to allow the lug 106 to move within the opening 104 of the lug 102, and then the rod is released so that the spring 116 will shift the rod forwardly and through the aligned apertures of the lugs.

Thus, this invention provides a new and improved counterbalance means for forwardly tilting cabs of cab-over-engine trucks. The counterbalancing means is operative to assist in movement of the cab from the normal position to the forwardly tilted position thereof and to also assist in movement of the cab from the forwardly tilted position to the normal position thereof. Thus, the operator need not exert any great effort in moving the cab between these positions. This is particularly advantageous in truck cabs of this type and represents a distinct advancement in counterbalance means for forwardly tilting truck cabs.

We claim:

1. The combination comprising, a vehicle chassis frame, a vehicle cab swingably mounted on said frame for movement between normal and tilted positions about an axis transverse of said frame, a torsion member anchored to said frame and defining a torque axis in parallel spaced relationship with the axis of swinging movement of said cab, a crank arm secured to said torsion member at one end thereof, and pin and slot means operatively securing the other end of said crank arm to said cab, said pin and slot means allowing said arm to swing about the torque axis during movement of said cab between said normal and tilted positions to counterbalance the weight of said cab during movement thereof.

2. The combination comprising, a vehicle chassis frame, a vehicle cab swingably mounted on said frame for movement between normal and tilted positions with respect thereto about an axis transverse of said frame, a torsion member anchored to said frame and defining a torque axis in parallel spaced relationship with the axis of swinging movement of said cab, a crank arm having one end thereof fixed to said torsion member, and pin and closed slot means operatively interconnecting the other end of said crank arm and said cab whereby said crank arm and torsion member counterbalance the weight of said cab during movement thereof between said normal and tilted positions, said pin being engageable with a closed end of said slot means when said cab is in one of said positions thereof for limiting swinging movement of said cab relative to said frame.

3. The combination comprising, a vehicle chassis frame, a vehicle cab swingably mounted on said frame for movement between normal and tilted positions with respect thereto about an axis transverse of said frame, a torsion member anchored to said frame and defining a torque axis in parallel spaced relationship with the axis of swinging movement of said cab, a crank arm having one end thereof fixed to said torsion member, and pin and closed slot means operatively interconnecting the other end of said crank arm and said cab whereby said crank arm and torsion member counterbalance the weight of said cab during movement thereof between said normal and tilted positions, said pin being engageable with opposite closed ends of said slot means when said cab is in either of said positions thereof for limiting swinging movement of said cab relative to said frame.

4. The combination comprising, a vehicle chassis frame, a vehicle cab swingably secured to said frame for movement to a forwardly tilted position wherein substantially all of the weight of said cab is forwardly of the pivotal axis thereof, a normal position wherein substantially all of the weight of said cab is rearwardly of the pivotal axis thereof, and a position intermediate said normal and forwardly tilted positions wherein the weight of said cab is substantially equally distributed to either side of the pivotal axis thereof, and torsion counterbalance means operatively interconnecting said cab and said frame, said counterbalance means having a free untorqued position when said cab is in said intermediate position and being selectively and alternately torqued when said cab is moved to either said normal or said forwardly tilted positions to thereby counterbalance the weight of said cab in either of said positions and bias said cab to said intermediate position thereof.

5. The combination recited in claim 4 wherein said torsion counterbalance means includes a torsion member extending transversely of said vehicle cab in parallel spaced relationship to the axis of swinging thereof, means anchoring said torsion member adjacent one end thereof to said chassis frame, crank arm means secured to said torsion rod adjacent the other end thereof, and means pivotally and slidably securing said crank arm means to said cab.

6. The combination recited in claim 4 wherein said torsion counterbalance means includes a torsion member extending transversely of said vehicle cab in parallel spaced relationship to the axis of swinging thereof, means fixedly anchoring said torsion member adjacent one end thereof to said chassis frame, means rotatably anchoring said torsion member adjacent the other end thereof to said chassis frame, a crank arm secured to said torsion rod adjacent the other end thereof, and means pivotally and slidably securing said crank arm to said cab.

7. The combination recited in claim 4 wherein said torsion counterbalance means includes a torsion member extending transversely of said vehicle cab in parallel spaced relationship to the axis of swinging thereof, means fixedly anchoring said torsion member adjacent one end thereof to said chassis frame, a slotted crank arm secured to said torsion rod adjacent the other end thereof, and pin means on said chassis frame received within said slot and engageable with the ends thereof to locate said cab in said normal and forwardly tilted positions.

8. The combination comprising, a vehicle chassis frame, a vehicle cab swingably secured to said frame for movement to a forwardly tilted position wherein substantially all of the weight of said cab is forwardly of the pivotal axis thereof, a normal position wherein substantially all of the weight of said cab is rearwardly of the pivotal axis thereof, and a position intermediate said normal and forwardly tilted positions wherein the weight of said cab is substantially equally distributed to either side of the pivotal axis thereof, and torsion counterbalance means operatively interconnecting said cab and said frame, said counterbalance means having a free untorqued position when said cab is in said intermediate position and being torqued when said cab is moved to said forwardly tilted position to thereby counterbalance the weight of said cab in said forwardly tilted position and bias said cab to said intermediate position thereof.

9. The combination comprising, a vehicle chassis frame, a vehicle cab swingably secured to said frame for movement to a forwardly tilted position wherein substantially all of the weight of said cab is forwardly of the pivotal axis thereof, a normal position wherein substantially all of the weight of said cab is rearwardly of the pivotal axis thereof, and a position intermediate said normal and forwardly tilted positions wherein the weight of said cab is substantially equally distributed to either side of the pivotal axis thereof, and torsion counterbalance means operatively interconnecting said cab and said frame, said counterbalance means having a free untorqued position when said cab is in said intermediate position and being torqued when said cab is moved to said normal position to thereby counterbalance the weight of said cab in said normal position and bias said cab to said intermediate position thereof.

References Cited in the file of this patent

UNITED STATES PATENTS

| | | |
|---|---|---|
| 1,791,643 | Smith | Feb. 10, 1931 |
| 1,915,134 | MacPherson | June 20, 1933 |
| 2,033,493 | Straussler | Mar. 10, 1936 |
| 2,148,308 | Spear | Feb. 21, 1939 |
| 2,549,266 | Troden et al. | Apr. 17, 1951 |
| 2,740,487 | Murty et al. | Apr. 3, 1956 |
| 2,864,121 | Imber et al. | Dec. 16, 1958 |

FOREIGN PATENTS

| | | |
|---|---|---|
| 103,814 | Australia | Apr. 26, 1938 |
| 252,590 | Great Britain | June 3, 1926 |
| 585,235 | Great Britain | Feb. 3, 1947 |